United States Patent [19]

Schouten

[11] Patent Number: 4,720,544

[45] Date of Patent: Jan. 19, 1988

[54] PROCESS FOR THE PREPARATION OF AN ESTER FROM STARCH AND A MONOCARBOXYLIC ACID, AND A COMPOSITION BASED ON THE STARCH ESTER THUS PREPARED

[75] Inventor: Arend J. Schouten, Peize, Netherlands

[73] Assignee: Akzo N.V., New York, N.Y.

[21] Appl. No.: 861,202

[22] Filed: May 8, 1986

[30] Foreign Application Priority Data

May 8, 1985 [NL] Netherlands ............................ 8501301

[51] Int. Cl.$^4$ ............................................. C08B 31/04
[52] U.S. Cl. ........................................ 536/110; 536/107
[58] Field of Search ................ 536/107, 108, 109, 110

[56] References Cited

U.S. PATENT DOCUMENTS

| | | | |
|---|---|---|---|
| 3,513,156 | 5/1970 | Speakman | 536/107 |
| 3,720,662 | 3/1973 | Tessler | 536/107 |
| 3,928,666 | 12/1975 | Morrison | 536/110 |
| 4,011,392 | 3/1977 | Rudolph | 536/108 |
| 4,501,888 | 2/1985 | Schmidt | 536/107 |

Primary Examiner—Paul R. Michl
Assistant Examiner—Terri Stevenson
Attorney, Agent, or Firm—Jeffrey S. Boone

[57] ABSTRACT

Preparation of a starch ester having an Mn of 1000–50,000 and a degree of substitution of 0.4–3.0 by heating a mixture of starch, a Cl-7 monocarboxylic acid, water, and optionally a catalyst and meanwhile withdrawing water until the ester being formed has attained the desired degree of substitution. Optionally remaining free hydroxyl groups may be esterified by reaction with a carboxylic anhydride of -halide. The resulting solution may be treated to neutralize remaining free monocarboxylic acid by mixing it with an esterifiable hydroxyl compound and esterifying it at 40°–270° under the removal of water. In this way, use is made of cheap ingredients, and the resulting product is suitable for immediate use in a number of applications, e.g., as binder in coating compositions.

11 Claims, No Drawings

PROCESS FOR THE PREPARATION OF AN ESTER FROM STARCH AND A MONOCARBOXYLIC ACID, AND A COMPOSITION BASED ON THE STARCH ESTER THUS PREPARED

BACKGROUND OF THE INVENTION

The invention relates to a process for the preparation of a starch ester of a number average molecular weight of 1000–50,000 and a degree of substitution of 0.4–3.0 by esterification of a starch with one or more monocarboxylic acids. By starch is to be understood here a starch which may or may not be degraded and/or alkoxylated. By degree of substitution is to be understood here the number of substituents, up to a maximum of 3.0 anhydroglucose unit.

In actual practice, the preparation of starch esters having a low degree of substitution is usually carried out by re-esterification with a vinyl ester or by reaction with acetic anhydride under alkaline or neutral conditions. The preparation of a starch ester having a high degree of substitution generally takes place in an organic solvent, use being made of acetic anhydride or an acid chloride. The large scale preparation in this way of starch ester from a higher monocarboxylic acid, however, is unattractive because of the lack of commercial anhydrides or acid chlorides. A problem to the preparation of starch esters is the poor solubility of starch in usual organic solvents and, moreover, starch is poorly accessible to organic compounds, which generally results in a low reactivity.

SUMMARY OF THE INVENTION

The process according to the invention is characterized in that a mixture of 100 parts by weight of starch, 0.5–9 equivalents per anhydroglucose unit of a monocarboxylic acid containing 1–7 carbon atoms and up to 1000 parts by weight of water is subjected to an esterification reaction at a temperature of 40°–270° C., in which process water is withdrawn from the mixture until the resulting starch ester has the degree of substitution desired. Subsequently, to the resulting solution in the monocarboxylic acid of the starch ester thus prepared there may be added a hydroxyl compound which can be esterified with the monocarboxylic acid containing 1–7 carbon atoms and the mixture obtained is subjected to an esterification reaction at a temperature of 40°–270° C. with simultaneously removal of water, so that there is obtained a solution of the starch ester in an ester of the monocarboxylic acid.

Advantages of the present process are that it can readily be applied on a large scale and that instead of expensive anhydrides or acid chlorides, use may be made of inexpensive, water-soluble monocarboxylic acids. Other advantages of the process are that the use of expensive organic solvents can be avoided, and that it can be carried out under the conditions of temperature, pressure and safety precautions normally observed in the chemical industry. Another advantage is that a product is obtained in a form in which it can be directly used in the fields of application mentioned below.

DETAILED DESCRIPTION OF THE INVENTION

The starch which in the process according to the invention is used as starting compound can be obtained in a known way by degradation beforehand or in situ or a natural starch by means of, for example, an acid or in accordance with an oxidative, enzymatic or mechanical method. The starch can be dried at 20° C. in an atmosphere of a relative humidity of 65%. Like cellulose, starch is a polysaccharide, but it differs from cellulose in that the anhydroglucose units are interconnected by a 1,4-$\beta$-glucosidic bond instead of a 1,4-$\alpha$-glucosidic bond. As a starch may be used any starch, such as maize starch, potato starch, wheat starch, rice starch, tapioca starch, or sorghum starch. According to the invention, it is preferred that use should be made of a native starch or a starch which has previously been degraded to a starch having a number average molecular weight of 1200–6000.

For the esterification of the starch with the monocarboxylic acid, it is preferred according to the invention that an aqueous mixture of the starch and the monocarboxylic acid be heated over a period ranging from a few minutes to a few days, preferably 6–14 hours, to a temperature of in particular 60°–165° C. It is preferred that use should be made of 1.0–3.0 equivalnts of the monocarboxylic acid per anhydroglycose unit of the starch. The mixture of the starch and the monocarboxylic acid preferably also contains up to 150 parts by weight of water per 100 parts by weight of starch.

Because of the afore-described esterification reaction, many hydroxyl groups will disappear from the starch, as a result of which it becomes satisfactorily soluble in organic solvents and therefore very suitable for use in coating compositions, printing inks and glues.

Examples of monocarboxylic acids containing 1–7 carbon atoms are formic acid, acetic acid, mono-, di- or tri-chloracetic acid, mercaptoacetic acid, propionic acid, 2-hydroxy-propionic acid, 2-chloropropionic acid, acrylic acid, 2-bromo-2-methyl propionic acid, methacrylic acid, 2,2-dimethyl propionic acid, butyric acid, isobutyric acid and crotonic acid. It is preferred that use should be made of a monocarboxylic acid containing 2–5 carbon atoms.

The esterification of the starch may optionally be carried out in the presence of a catalyst, for instance an acid compound such as methane sulphonic acid, p-toluene sulphonic acid, oxalic acid, sulphuric acid, hydrochloric acid, a sulphonic acid cation exchanger, phosphoric acid, nitric acid, or a Lewis acid, such a zinc chloride or the ether adduct of boron trifluoride. These catalysts are generally applied in a concentration of 0–10% by weight, preferably 2–4% by weight, based on the starch.

During or after the afore-described esterification reaction according to the present process, so much water will be removed from the esterification mixture that a product of the desired degree of substitution is obtained. The water is generally removed by distillation, preferably under reduced pressure and/or by azeotropic distillation, use being made of an organic solvent, such as toluene, xylene, trichloromethane and methylene chloride.

If desired subsequent to the reaction of the starch with the monocarboxylic acid, the remaining free hydroxyls of the starch can be reacted with a carboxylic anhydride or carboxylic halide. Such reactions are well known to those skilled in the art. In the instant invention, such a reaction will result in a degree of substitution of 3, with an increase in hydrophilicity and thus higher solubility in organic solvents.

An essential step in the process according to the invention is the conversion of non-reacted monocarboxylic acid in the solution of the prepared starch ester in the monocarboxylic acid. To this end, a suitable amount of a hydroxyl compound esterifiable with the monocarboxylic acid is added and the resulting mixture subjected to an esterification reaction. As a rule, the esterifiable hydroxyl compound is added in an amount of 0.85–1.0, preferably 0.98–1.0 equivalent per equivalent of monocarboxylic acid. This esterification reaction is generally carried out at a temperature of 40°–270° C., preferably 60°–165° C.

As examples of suitable hydroxyl compounds may be mentioned ethanol, n-propanol, ethylene glycol, 1,6 hexane diol, glycerol, tripropylene glycol and pentaerythritol. It is preferred that use should be made of ethylene glcyol. The water evolved during the esterification reaction is removed by distillation in a known manner, for instance azeotropically, using an organic solvent such as toluene.

The dissolved starch ester prepared by the process of the invention may advantageously be applied in many fields, for instance, as a binder in a coating composition together with a suitable curing agent such as an aminoplast or a polyisocyanate, or as a substitute for cellulose acetobutyrate. The present starch ester solutions may also be used in a UV-curable offset printing ink or as a substitute for ethyl cellulose in a rotogravure ink. Further, they may be applied as so-called polyol component in glues.

The invention will be further described in but not limited by the following examples. The term air-dry starch as used in these examples refers to a starch dried at a temperature of 20° C. in an atmosphere of a relative humidity of 65%. The thickness of the coating was measured in the dried state.

EXAMPLE 1

To a mixture of 693 g of propionic acid and 20 g of paratoluene sulphonic acid contained in a reactor equipped with a stirrer, a gas inlet and an axeotropic water separator there were added, with stirring, 500 g of air-dry, acid-degraded potato starch (moisture content: 10%; number average molecular weight: 1400). The suspension was heated, with stirring, to a temperature of 100° C. After 30 minutes, the starch had dissolved. The solution was then cooled to 80° C. Subsequently, water was distilled off under subatmospheric pressure and the vacuum was gradually increased. After 9½ hours, the degree of substitution was 1.57 and in all, 400 ml of liquid (120 ml of water and 280 ml of propionic acid) had been removed. After 250 ml of toluene had been added, another 20 ml of water were removed as toluene/water azeotrope. Then 55 g of ethylene glycol were added and, over a period of 2 hours, the remaining propionic acid was esterified, in which process another 20 ml of water were removed azeotropically. Adding 3.9 g of lithium carbonate resulted in the neutralization of the paratoluene sulphonic acid catalyst. After filtration, a clear solution having a solids content of 50% by weight was obtained. The starch ester prepared had a degree of substitution of 1.57 and a number average molecular weight of 2000.

Next, a coating composition was prepared from 140 g of the afore-described starch ester solution, 43 g of a 70% by weight solution of a partially butoxylated melamine, 100 g of rutile titanium dioxide and 10 g of propylene glycol methyl ether acetate; it was ground to a fineness smaller than 5 µm. The composition was brought to spray viscosity (19 seconds DIN-cup No. 4 at 20° C.) with a mixture of equal parts by weight of xylene and propylene glycol methyl ether acetate. The sprayable composition, which had a very high solids content (55% by weight), was sprayed onto a steel panel (Bonder 132) at a pressure of 3 bar and in a thickness of 30 µm. After 10 minutes, the coating was cured for 30 minutes at a temperature of 100° C. The resulting coating displayed a high gloss (95 at 60°), satisfactory hardness (160 seconds Konig hardness) and excellent resistance to organic solvents and water and after a test period of 24 hours the coating did not shown any changes.

EXAMPLE 2

In a reactor fitted with a stirrer, a gas inlet and an azeotropic water separator, a suspension of 300 g of air-dry, acid-degraded potato starch (moisture content: 10%; number average molecular weight: 2500) in a mixture of 300 g of water, 300 g of butyric acid and 6 g of methane sulphonic acid was heated to a temperature of 95° C. After 4 hours, the starch had dissolved. Subsequently, the temperature was decreased to 80° C. and 200 ml of butyric acid were added to the solution. At that temperature, water was removed at subatmospheric pressure and the vacuum was gradually increased. After 8½ hours, 550 ml of liquid (360 ml of water and 190 ml of butyric acid) had been removed. Following the addition of 270 ml of toluene, another 25 ml of water were removed. The resulting starch ester had a dgree of substitution of 1.6. Subsequently, 200 ml of acetic anhydride were added. After all OH-groups had reacted, acetic acid was distilled off as well as was possible. Subsequently, 125 g of ethylene glycol were added and the remaining butyric acid was esterified and water was removed azeotropically in the same way as indicated in Example 1. After neutralization of the catalyst by means of lithium carbonate and filtration, a clear solution having a solids content of 58% by weight was obtained. The starch ester prepared had a degree of substitution of 3.0, and a number average molecular weight of 3000.

Next, a coating composition was prepared from 11.6 g of the previously prepared solution of the starch ester, 15.8 g of a vinyl acetate copolymer (available under the trademark Cerafak 100 XB 10 of Cera Chemie), 24.0 g of a saturated polyester resin (available under the trademark Setal 173-GR-60 of Kunstharsfabriek Synthese), 6.7 g of a paste of an aluminum pigment (available under the trademark Sparkle Silver AR 5000 of Silberline), 12.2 g of butyl acetate and 8.9 g of xylene. This composition with a relatively high solids content of 43% was sprayed on to a steel panel (Bonder 132) in a coating thickness of 15 µm. After 15 minutes, a conventional clear composition based on an acrylate polyol and a polyisocyanate was applied by spraying wet on wet in a coating thickness of 40 m and cured for 7 days at room temperature. While the clear composition was applied, it was not found to mix (strike-in) with the undercoat. The coating system obtained displayed a good appearance.

EXAMPLE 3

In a reactor equipped with a gas inlet, a stirrer and an azeotropic water separator, 500 g of air-dry, acid-degraded potato starch (moisture content: 10%; number average molecular weight: 1400) were dissolved under nitrogen in 300 g of water at 90° C. Thereupon, 250 g of propionic acid and 5 g of hydroquinone were added. After the solution had become clear, it was cooled to 60° C. and 250 g of acrylic acid and 10 g of methane sulphonic acid were added. After the solution had turned clear again, the removal of water by vacuum distillation was started. After 4 hours, another 100 g of propionic acid and 100 g of acrylic acid were added and the removal of water was continued using toluene as an entrainer. The resulting starch ester had a degree of substitution of 1.5. Thereupon, 425 g of acetic anhydride were added. After all OH-groups had reacted, acetic acid was distilled off as well as was possible. Subsequently, 140 g of ethylene glycol were added and the remaining propionic acid and acrylic acid was esterified and water was removed azeotropically in the same way as indicated in Example 1. After neutralization of the catalyst by means of lithium carbonate and filtration, a clear solution having a solids content of 50% by weight was obtained. The starch ester prepared had a degree of substitution of 3.0 and a number average molecular weight of 2000.

Then an overprint varnish with a viscosity of 5 Pa.s was prepared from 62.6 g of the previously prepared solution of the starch ester, 68.7 g of the triacrylic ester of the adduct of 1 mole of glycerol and 3 moles of propylene oxide and 7.5 g of methoxybenzoin methyl ether. The composition was roller coated onto cardboard in a layer thickness of 12 μm and cured for 1.8 seconds by subjecting it to UV radiation from a high-pressure UV lamp (Hannovia 80 W/cm) positioned at a distance from it of 7 cm. A non-sticky surface was obtained. The coating displayed a gloss higher than 90 at an angle of 60° and very good mechanical properties, such as excellent flexibility.

EXAMPLE 4

The preparation of the starch ester solution according to Example 1 was repeated, except that use was made of a maize starch having a moisture content of 13% and a number average molecular weight of $320 \times 10^6$. This starch was mixed with 500 g of water, 500 g of butyric acid and 10 g of methane sulphonic acid. After 36 hours, the degree of substitution was 1.73. Then 100 g of ethylene glycol were added, and a clear solution with a solids content of 60% by weight was obtained. The starch ester prepared had a degree of substitution of 1.73 and a number average molecular weight of 16,000.

EXAMPLE 5

Example 4 was repeated, except that use was made of an acid-degraded potato starch having a moisture content of 10% and a number average molecular weight of 1400. This starch was mixed with 500 g of water, 1000 g of crotonic acid and 10 g of methane sulphonic acid. The starch ester prepared had a degree of substitution of 1.70. Then 322 g of ethylene glycol were added and a clear solution with a solids content of 32% by weight was obtained. The resulting starch ester had a degree of substitution of 1.70 and a number average molecular weight of 2000.

I claim:

1. A process for the preparation of a starch ester of a number average molecular weight of 1000–50,000 and a degree of substitution of 0.4–3.0 by esterification of a starch with one or more monocarboxylic acids, characterized in that a mixture of 100 parts by weight of starch, 0.5–9 equivalents per anhydroglucose unit of a monocarboxylic acid containing 1–7 carbon atoms and up to 1000 parts by weight of water is subjected to an esterification reaction at a temperature of 40°–270° C., in which process water is withdrawn from the mixture until the resulting starch ester has the degree of substitution desired.

2. A process according to claim 1, characterized in that the remaining free hydroxyl groups of the monocarboxylic starch ester formed are esterified in a manner known per se with a carboxylic anhydride or a carboxylic halide.

3. A process according to claim 1, characterized in that to the resulting solution of the starch ester there is added a hydroxyl compound which is esterifiable with the monocarboxylic acid containing 1–7 carbon atoms and the mixture obtained is subjected to an esterification reaction at a temperature in the range of 40°–270° C. with simultaneous removal of water, so that there is obtained a solution of the starch ester in a monocarboxylic ester.

4. A process according to claim 2, characterized in that to the resulting solution of the starch ester there is added a hydroxyl compound which is esterifiable with the monocarboxylic acid containing 1–7 carbon atoms and the mixture obtained is subjected to an esterification reaction at a temperature in the range of 40°–270° C. with simultaneous removal of water, so that there is obtained a solution of the starch ester in a monocarboxylic ester.

5. A process according to claim 1, characterized in that as starch a native starch is used.

6. A process according to claim 1, characterized in that use is made of a starch having a number average molecular weight in the range of 1200 to 6000.

7. A process according to claim 1, characterized in that the monocarboxylic acid is used in an amount of 1.0–3.0 equivalents per anhydroglucose unit of the starch.

8. A process according to claim 1, characterized in that use is made of up to 150 parts by weight of water per 100 parts by weight of starch.

9. A process according to claim 1, characterized in that the esterification reaction is carried out in the presence of a catalyst.

10. A process according to claim 1, characterized in that use is made of a monocarboxylic acid containing 2–5 carbon atoms.

11. A process according to claim 3 or 4, characterized in that the esterifiable hydroxyl compound is added in an amount of 0.85–1.0 equivalent per equivalent of monocarboxylic acid.

* * * * *